United States Patent Office 3,075,846
Patented Jan. 29, 1963

3,075,846
MOULD FOR SHAPING CERAMIC MATERIAL
Heinrich Seltmann, 184 Friedrichstrasse,
Schirnding, Bavaria, Germany
No Drawing. Filed July 22, 1959, Ser. No. 828,708
Claims priority, application Germany Aug. 28, 1958
1 Claim. (Cl. 106—38.9)

The invention refers to a mould for (centrifugal or cast) shaping of ceramic material such as porcelain.

According to the invention, the ceramic body of the mould is made of a substance rich of clay, having only a small quantity of flux and being fired at a high temperature. Such moulds are resistant to blows and pressure. In spite of the high firing temperature, they have sufficient porosity resulting from their structure to extract the water from the ceramic moulded piece. For drying such moulds, not more than 15 minutes will be required.

For producing moulds according to the invention, the following mass compositions can be used:

Example I:
    60 volume percent of $Al_2O_3$
    33 volume percent of $SiO_2$
    7 volume percent of MgO Example II:
    64 volume percent of $Al_2O_3$
    29 volume percent of $SiO_2$
    7 volume percent of MgO The firing temperature is around 1450° C. The percentage of shrinkage is 3.5% for the mass according to Example I, 3.2% for the mass according to Example II. Water receptivity of the mass according to Example I is about 22%, of the mass according to Example II about 25%.

The moulds made according to the invention are manufactured in the manner usual in ceramic factories. They are particularly adapted for shaping porcelain material.

I claim:
A mould for shaping ceramic material consisting of a fired, water-receptive ceramic body composed of a substance rich in clay and fired at a high temperature, the body being composed of 60% to 64% $Al_2O_3$, 29% to 33% $SiO_2$ and 7% MgO by volume, the water receptivity being approximately 22% to 25%.

References Cited in the file of this patent

UNITED STATES PATENTS

| | | |
|---|---|---|
| 85,340 | Smith | Dec. 29, 1868 |
| 1,476,001 | McIntosh | Dec. 4, 1923 |
| 1,993,955 | Benner | Mar. 12, 1935 |
| 2,026,624 | Flower | Jan. 7, 1936 |
| 2,175,707 | Shardlow | Oct. 10, 1939 |
| 2,372,236 | Wainer | Mar. 27, 1945 |
| 2,695,241 | Calis | Nov. 23, 1954 |
| 2,731,355 | Skinner | Jan. 17, 1956 |
| 2,809,898 | Thiess | Oct. 15, 1957 |
| 2,864,919 | Stringfellow | Dec. 16, 1958 |

OTHER REFERENCES

Searle: Encyclopedia of the Ceramic Industries, vol. 2, 1930, pub. London by Benn Ltd., page 332.